(12) United States Patent
Knutson et al.

(10) Patent No.: US 11,220,353 B2
(45) Date of Patent: Jan. 11, 2022

(54) METHOD OF FABRICATING A COMPOSITE STRUCTURE

(71) Applicant: The Boeing Company, Chicago, IL (US)

(72) Inventors: Samuel James Knutson, Ladson, SC (US); Brian Timothy Peters, North Charleston, SC (US); Brian Bentley Reid, Charleston, SC (US); Byron James Autry, North Charleston, SC (US); Raviendra Suriyaarachchi, Ladson, SC (US); James R. Kendall, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 77 days.

(21) Appl. No.: 16/388,791

(22) Filed: Apr. 18, 2019

(65) Prior Publication Data

US 2020/0331634 A1    Oct. 22, 2020

(51) Int. Cl.
| | |
|---|---|
| *B64F 5/10* | (2017.01) |
| *B29C 70/34* | (2006.01) |
| *B29C 70/44* | (2006.01) |
| *B29L 31/30* | (2006.01) |
| *B64C 1/00* | (2006.01) |

(52) U.S. Cl.
CPC ............... *B64F 5/10* (2017.01); *B29C 70/34* (2013.01); *B29C 70/446* (2013.01); *B29L 2031/3082* (2013.01); *B64C 2001/0072* (2013.01)

(58) Field of Classification Search
None
See application file for complete search history.

(56) References Cited

U.S. PATENT DOCUMENTS

| | | | | |
|---|---|---|---|---|
| 8,168,023 B2 * | 5/2012 | Chapman | .................. | B64C 1/12 156/173 |
| 8,752,791 B2 * | 6/2014 | Griess | ..................... | B64C 1/068 244/119 |
| 10,001,365 B2 * | 6/2018 | Smith | .................... | G01B 11/03 |
| 2015/0183503 A1 * | 7/2015 | Miguez Charines | ... | B64C 3/182 244/133 |
| 2020/0094497 A1 * | 3/2020 | Saini | ....................... | B29C 70/56 |

* cited by examiner

*Primary Examiner* — Mark A Osele
*Assistant Examiner* — Evan T Hulting
(74) *Attorney, Agent, or Firm* — Yee & Associates, P.C.

(57) ABSTRACT

A method of fabricating a composite structure is presented. The method comprises laying up a plurality of composite plies over a layup mandrel; positioning a first caul plate and a second caul plate over the plurality of composite plies, leaving composite material exposed; removing at least part of the composite material exposed between the first caul plate and the second caul plate to separate a first composite section from a second composite section; curing the first composite section and the second composite section to form a first composite part and a second composite part; and removing the first composite part and the second composite part from the layup mandrel immediately following curing.

11 Claims, 13 Drawing Sheets

METHOD OF FABRICATING A COMPOSITE STRUCTURE

BACKGROUND INFORMATION

1. Field

The present disclosure relates generally to manufacturing composite structures and, more specifically, to manufacturing composite structures on layup mandrels.

2. Background

Composite materials are tough, light-weight materials created by combining two or more functional components. For example, a composite material may include reinforcing fibers bound in polymer resin matrix.

In manufacturing composite structures, layers of composite material are typically laid up on a tool, such as a layup mandrel. The layers may be laid up as fabric, tape, tows, or other suitable forms. For thermosetting resins, after laying up the composite material, the composite material is cured by exposure to at least one of temperature or pressure to form a composite part.

For large composite structures such as composite fuselages, the manufacturing time, the manufacturing cost, the capital investment costs, and raw material costs are substantial. It is desirable to reduce at least one of the time and the cost, and to maximize raw material usage (e.g. minimize material waste or scrap) involved in manufacturing large composite structures, such as composite fuselages.

Therefore, it would be desirable to have a method and apparatus that takes into account at least some of the issues discussed above, as well as other possible issues. For example, it would be desirable to have a method that reduces at least one of manufacturing cost or manufacturing time.

SUMMARY

An illustrative embodiment of the present disclosure provides a method of fabricating a composite structure. A plurality of composite plies is laid up over a layup mandrel. A first caul plate and a second caul plate are positioned over the plurality of composite plies, leaving composite material exposed. At least part of the composite material exposed between the first caul plate and the second caul plate is removed to separate a first composite section from a second composite section. The first composite section and the second composite section are cured to form a first composite part and a second composite part. The first composite part and the second composite part are removed from the layup mandrel immediately following curing.

Another illustrative embodiment of the present disclosure provides a method of reducing flow time of a layup mandrel in composite fuselage manufacturing. A first half of a fuselage and a second half of the fuselage are cured on the layup mandrel. The first half of the fuselage and the second half of the fuselage are removed from the layup mandrel after curing and prior to performing post cure drilling or trimming on either the first half of the fuselage or the second half of the fuselage.

Yet another illustrative embodiment of the present disclosure provides a method of fabricating a composite structure. A plurality of composite plies is laid up onto a layup mandrel. Composite material is removed from the layup mandrel to form a plurality of composite sections prior to curing. A respective bagging material is sealed over each composite section of the plurality of composite sections and to the layup mandrel to form a plurality of sealed regions, each sealed region of the plurality of sealed regions encompassing a respective composite section prior to curing. The plurality of composite sections is cured to form a plurality of composite parts. The plurality of composite parts is removed from the layup mandrel after curing and prior to performing a post cure machining operation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that large and complex tooling in composite manufacturing involves large, upfront capital investment. For reusable tooling, product cycle time influences the total capital investment for manufacturing multiple parts. For example, reducing product cycle time increases the quantity of parts that a single tool can create in a time period.

For manufacturing composite fuselages for aircraft, a large mandrel is utilized for layup of the composite materials. Composite material is laid up and then cured on the mandrel. In some illustrative examples, the mandrel may be referred to as a "layup mandrel," or a "layup and cure mandrel." The layup mandrel is an expensive and specialized piece of tooling. Reducing the flow time for a fuselage on the layup mandrel increases the quantity of fuselages that may be manufactured using the same layup mandrel during a time period.

The illustrative embodiments recognize and take into account that reducing flow time on the layup mandrel is a component of high rate composite fuselage tooling cost reduction. The illustrative embodiments recognize and take into account that a reduction in mandrel flow time through the factory is an effective cost-saving improvement within aircraft fuselage fabrication. For example, reducing the mandrel flow time may reduce a quantity of mandrels present for manufacturing.

The illustrative embodiments recognize and take into account that conventional fuselage production performs trim and drill of large composite structures on the cure mandrel. Conventional fuselage production also includes removing bladders from the fuselage prior to trimming. After drilling and trimming post-cure, the composite structure is removed from the cure mandrel. The illustrative embodiments recognize and take into account that the layup mandrel may be a more expensive tool in the production program. The illustrative embodiments recognize and take into account that it may be desirable to move some manufacturing steps to other less expensive tools.

The illustrative embodiments present methods of fabricating a composite structure. A plurality of composite plies is laid up over a layup mandrel. A first caul plate and a second caul plate are positioned over the plurality of composite plies, leaving composite material exposed. At least part of the composite material exposed between the first caul plate and the second caul plate is removed to separate a first composite section from a second composite section. The first composite section and the second composite section are cured to form a first composite part and a second composite part. The first composite part and the second composite part are removed from the layup mandrel immediately following curing.

Figure 1:
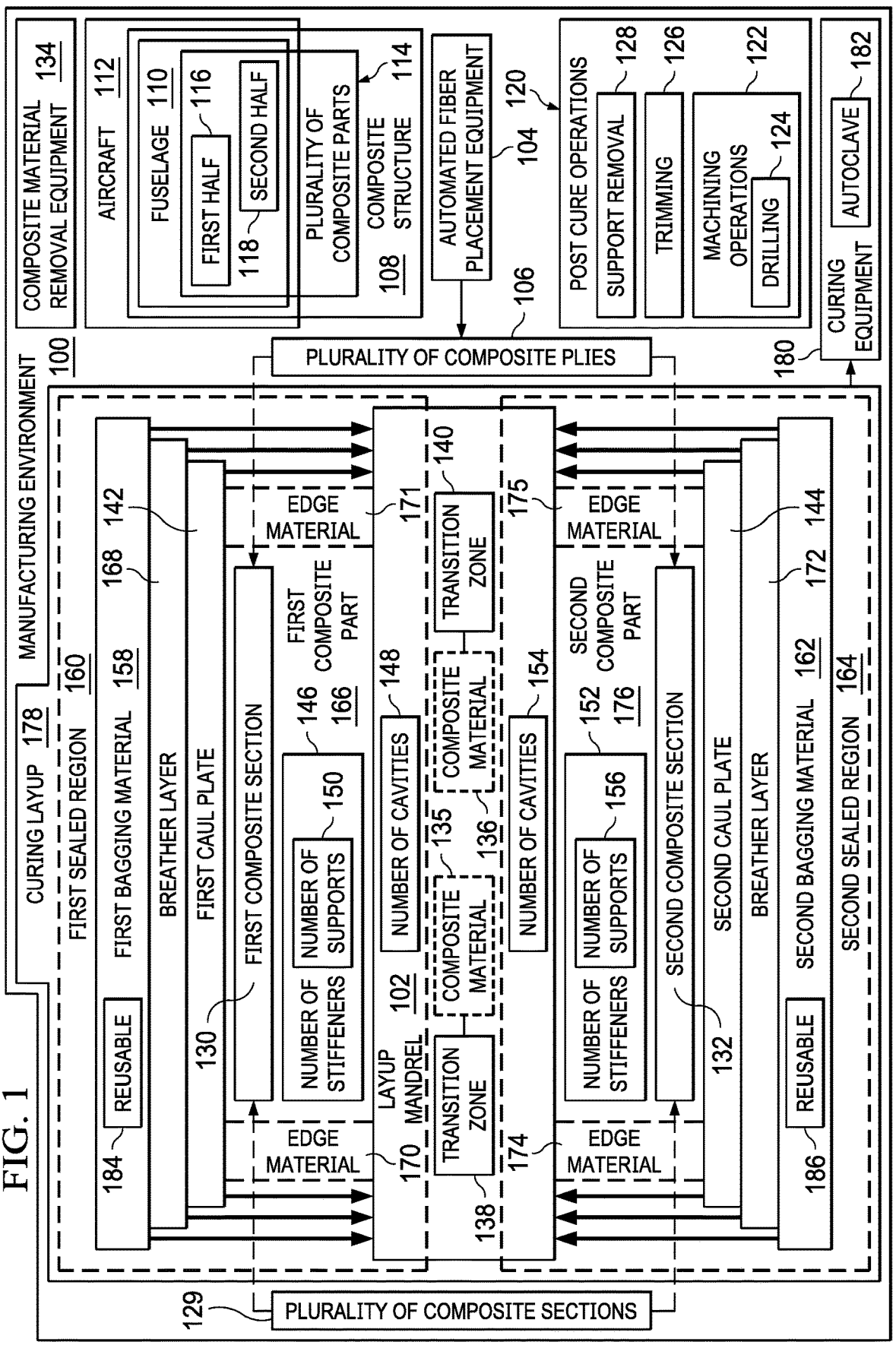
FIG. 1 is an illustration of a block diagram of a manufacturing environment in which a composite structure is manufactured in accordance with an illustrative embodiment.

Turning now to FIG. 1, an illustration of a block diagram of a manufacturing environment in which a composite structure is manufactured is depicted in accordance with an illustrative embodiment.

Manufacturing environment 100 includes layup mandrel 102 and automated fiber placement equipment 104 configured to lay up plurality of composite plies 106 onto layup mandrel 102. Composite structure 108 is fabricated in manufacturing environment 100. Composite structure 108 takes the form any desirable type of large composite structure. In some illustrative examples, composite structure 108 is fuselage 110 of aircraft 112.

Composite structure 108 is formed of plurality of composite parts 114. A plurality of items is two or more items. Plurality of composite parts 114 is two or more composite parts. Plurality of composite parts 114 are joined to form composite structure 108. In some illustrative examples, plurality of composite parts 114 are first half 116 and second half 118 of composite structure 108. In some illustrative examples, when composite structure 108 is fuselage 110, plurality of composite parts 114 are first half 116 and second half 118 of fuselage 110.

To join plurality of composite parts 114 to form composite structure 108, post cure operations 120 are performed on plurality of composite parts 114. Post cure operations 120 include any desirable operations performed on plurality of composite parts 114 after curing. In some illustrative examples, post cure operations 120 include machining operations 122, such as drilling 124. In some illustrative examples, machining operations 122 include operations for preparing each composite part of plurality of composite parts for joining. In some illustrative examples, post cure operations 120 include trimming 126. Trimming 126 removes excess material from plurality of composite parts 114 and prepares plurality of composite parts 114 for joining.

When supports, such as bladders or mandrels, are present for curing, post cure operations 120 includes support removal 128. In some illustrative examples, support removal 128 occurs prior to machining operations 122 and trimming 126.

To form composite structure 108, plurality of composite plies 106 is laid up over layup mandrel 102. Prior to curing plurality of composite plies 106, plurality of composite plies 106 is divided into plurality of composite sections 129. As depicted in FIG. 1, plurality of composite plies 106 is divided into first composite section 130 and second composite section 132. However, plurality of composite sections 129 includes any desirable quantity of sections. In some non-depicted examples, the plurality of composite sections comprises more than two composite sections.

Portions of plurality of composite plies 106 are removed using composite material removal equipment 134. Composite material removal equipment 134 takes any desirable form. In some illustrative examples, composite material removal equipment 134 takes the form of a shearing tool, such as scissors. In some other illustrative examples, composite material removal equipment 134 takes the form of a knife, such as an ultrasonic knife.

In this depicted illustrative example, composite material 135 and composite material 136 are removed to separate first composite section 130 from second composite section. The portions of layup mandrel 102 beneath composite material 135 and composite material 136 may be referred to as transition zones. For example, composite material 135 is removed from transition zone 138 of layup mandrel 102. As another example, composite material 136 is removed from transition zone 140.

Composite material of plurality of composite plies 106 to be removed is identified in any desirable fashion. In some illustrative examples, composite material 135 and composite material 136 is identified using indexing on layup mandrel 102. In some illustrative examples, composite material 135 and composite material 136 is identified using indexing projected onto plurality of composite plies 106. In some illustrative examples, composite material 135 and composite material 136 is identified using separate tooling. In one example, composite material 135 and composite material 136 is identified using first caul plate 142 and second caul plate 144. In this illustrative example, composite material is exposed when first caul plate 142 and second caul plate 144 are positioned over plurality of composite plies 106. In this illustrative example, composite material 135 and composite material 136 are at least part of the composite material exposed when first caul plate 142 and second caul plate 144 are positioned over plurality of composite plies 106.

In some illustrative examples, composite structure 108 is a stiffened composite structure. In some of these illustrative examples, plurality of composite plies 106 is laid up over cavities of layup mandrel 102. In these illustrative examples, plurality of composite plies 106 is laid up over stiffeners positioned in the cavities of layup mandrel 102.

For example, number of stiffeners 146 is positioned in number of cavities 148 under first composite section 130. As used herein, a "number of," when used with reference to items, means one or more items. Number of stiffeners 146 is one or more stiffeners.

Number of stiffeners 146 may also be referred to as "stringers." Number of supports 150 is present within number of stiffeners 146 to provide support to number of stiffeners 146 during curing. Number of supports 150 takes the form of mandrels, bladders, or any other desirable type of internal shape support.

Number of stiffeners 146 is positioned in number of cavities 148 according to any desirable method. In some illustrative examples, each component of number of stiffeners 146 is laid up sequentially within number of cavities 148. For example, a stiffener includes a number of composite charges, a number of composite fillers, and a support. In some illustrative examples, each of the number of composite charges, composite fillers, and support are positioned within a respective cavity sequentially to build up the stiffener within the cavity. The stiffener has any desirable cross-sectional shape.

In some other illustrative examples, each stiffener of number of stiffeners 146 is placed as a stringer package, each having a pre-formed stiffener and a support, into a respective cavity of layup mandrel 102 prior to laying up plurality of composite plies 106. In these illustrative examples, each stiffener is formed and then subsequently placed within a respective cavity.

As depicted, number of stiffeners 152 is positioned in number of cavities 154 under second composite section 132. Number of supports 156 is present within number of stiffeners 152 to provide support to number of stiffeners 152 during curing. Number of supports 156 takes the form of mandrels, bladders, or any other desirable type of internal shape support. Number of stiffeners 152 is positioned in number of cavities 154 according to any desirable method.

After separating plurality of composite plies 106 into plurality of composite sections 129, plurality of composite sections 129 is prepared for curing. To prepare plurality of composite sections 129 for curing bagging material is sealed over plurality of composite sections 129. In some illustrative examples, a same sheet of bagging material is sealed over all of plurality of composite sections 129. In some illustrative examples, a plurality of bagging material sheets is used to seal each composite section of plurality of composite sections 129 individually.

As depicted, first bagging material 158 is sealed over first composite section 130 to layup mandrel 102 to form first sealed region 160 prior to curing. As depicted, second bagging material 162 is sealed over second composite section 132 to layup mandrel 102 to form second sealed region 164 prior to curing.

First bagging material 158 is selected to draw a vacuum in first sealed region 160. First bagging material 158 is formed of any desirable material. In some illustrative examples, first bagging material 158 is a reusable vacuum bagging material. In some illustrative examples, first bagging material 158 is a single-use vacuum bagging film.

Second bagging material 162 is selected to draw a vacuum in second sealed region 164. Second bagging material 162 is formed of any desirable material. In some illustrative examples, second bagging material 162 is a reusable vacuum bagging material. In some illustrative examples, second bagging material 162 is a single-use vacuum bagging film. Second bagging material 162 may be formed of the same, or different material as first bagging material 158.

In this illustrative example, first sealed region 160 also includes additional layers. As depicted, first sealed region 160 also includes breather layer 168, edge material 170, and edge material 171. Each of breather layer 168, edge material 170, and edge material 171 aid in producing first composite part 166 having a desirable quality following curing of first composite section 130. In this illustrative example, breather layer 168 is present between first bagging material 158 and first caul plate 142. Breather layer 168 reduces first bagging material 158 from bag bridging. Edge material 170 and edge material 171 are positioned against edges of first composite section 130. Edge material 170 and edge material 171 are formed of any desirable damming material. Edge material 170 and edge material 171 reduce undesirable edge effects to first composite section 130 during curing. Edge material 170 and edge material 171 reduce bag bridging for first bagging material 158.

In this illustrative example, second sealed region 164 also includes additional layers. As depicted, second sealed region 164 also includes breather layer 172, edge material 174, and edge material 175. Each of breather layer 172, edge material 174, and edge material 175 aid in producing second composite part 176 having a desirable quality following curing of second composite section 132. In this illustrative example, breather layer 172 is present between second bagging material 162 and second caul plate 144. Breather layer 172 reduces second bagging material 162 from bag bridging. Edge material 174 and edge material 175 are positioned against edges of second composite section 132. Edge material 174 and edge material 175 are formed of any desirable damming material. Edge material 174 and edge material 175 reduce undesirable edge effects to second composite section 132 during curing. Edge material 174 and edge material 175 reduce bag bridging for second bagging material 162.

Curing layup 178 includes plurality of composite sections 129 and all materials used to seal plurality of composite sections 129 for curing. For example, as depicted, curing layup 178 includes layup mandrel 102, first bagging material 158, second bagging material 162, all material between first bagging material 158 and layup mandrel 102, and all material between second bagging material 162 and layup mandrel 102. Curing layup 178, including first composite section 130 and second composite section 132 on layup mandrel 102 and respective vacuum bagging materials, is subjected to at least one of pressure or heat by curing equipment 180.

Curing equipment 180, such as autoclave 182, is used to cure first composite section 130 and second composite section 132. In some illustrative examples, curing layup 178 is placed into autoclave 182 to cure first composite section 130 and second composite section 132. Curing first composite section 130 and second composite section 132 forms first composite part 166 and second composite part 176.

After curing, curing layup 178 is removed from autoclave 182. After curing, processing materials are removed from first composite part 166 and second composite part 176. After curing, second bagging material 162, breather layer 172, second caul plate 144, edge material 174, and edge material 175 is removed from second composite part 176. After removing the processing materials: second bagging material 162, breather layer 172, second caul plate 144, edge material 174, and edge material 175 from second composite part 176, second composite part 176 is removed from layup mandrel 102.

After curing, first bagging material 158, breather layer 168, first caul plate 142, edge material 170, and edge material 171 are removed from first composite part 166. After removing the processing materials: first bagging material 158, breather layer 168, first caul plate 142, edge material 170, and edge material 171 from first composite part 166, first composite part 166 is removed from layup mandrel 102.

Post cure operations 120 are performed on first composite part 166 and second composite part 176 after removal from layup mandrel 102. When first composite part 166 and second composite part 176 are removed from layup mandrel 102, layup mandrel 102 is available for forming a second composite structure. By performing post cure operations 120 on first composite part 166 and second composite part 176 on a tool other than layup mandrel 102, the time that plurality of composite plies 106 spends on layup mandrel 102 is reduced. By performing post cure operations 120 on first composite part 166 and second composite part 176 on a tool other than layup mandrel 102, layup mandrel 102 is recycled back into the production flow faster.

After removing first composite part 166 and second composite part 176 from layup mandrel 102, layup mandrel 102 is prepared to receive composite material to form components of a second composite structure. Layup mandrel 102 is a reusable tool. By reducing cycle time of layup mandrel 102, layup mandrel 102 may be used to form a greater quantity of composite parts in the same period of time. By reducing cycle time of layup mandrel 102, fewer layup mandrels may be purchased. By reducing cycle time of layup mandrel 102, upfront capital investment may be reduced.

In some illustrative examples, first bagging material 158 is reusable 184. When first bagging material 158 is reusable 184, first bagging material 158 may also be used to cure a component of a second composite structure. In some illustrative examples, first bagging material 158 is reused during curing of a second fuselage on layup mandrel 102.

In some illustrative examples, second bagging material 162 is reusable 186. When second bagging material 162 is reusable 186, second bagging material 162 may also be used to cure a component of a second composite structure. In some illustrative examples, second bagging material 162 is reused during curing of a second composite structure on layup mandrel 102.

In some illustrative examples when number of supports 150 is present in first composite part 166, support removal 128 is performed after removing first composite part 166 from layup mandrel 102. In some illustrative examples when number of supports 156 is present in second composite part 176, support removal 128 is performed after removing second composite part 176 from layup mandrel 102. In some illustrative examples, performing support removal 128 off of layup mandrel 102 reduces the difficulty of removing number of supports 150 and number of supports 156.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Curing layup 178 is a non-limiting example of a layup for curing plurality of composite sections 129. Some components may be optional or combined. For example, breather layer 168 and breather layer 172 may be optional. In some illustrative examples, breather layer 168 may only extend over a portion of first caul plate 142. In some illustrative examples, breather layer 172 may only extend over a portion of second caul plate 144.

As another example, second bagging material 162 is optional when curing layup 178 includes a single sealed region encompassing first composite section 130 and second composite section 132. As yet another example, plurality of composite sections 129 includes more than two composite sections.

In some other illustrative examples, first bagging material 158 and second bagging material 162 may not be separate components from first caul plate 142 and second caul plate 144. For example, first caul plate 142 may act as both a caul and a bagging material. In some illustrative examples, first bagging material 158 may be a portion of first caul plate 142. As another example, second caul plate 144 may act as both a caul and a bagging material.

In some illustrative examples, when first bagging material 158 is reusable, some components of breather layer 168, edge material 170, and edge material 171 may be incorporated into first bagging material 158. In some other illustrative examples, when first bagging material 158 is reusable, some components of breather layer 168, edge material 170, and edge material 171 may not be present.

In some illustrative examples, when second bagging material 162 is reusable, some components of breather layer 172, edge material 174, and edge material 175 may be incorporated into second bagging material 162. In some other illustrative examples, when second bagging material 162 is reusable, some components of breather layer 172, edge material 174, and edge material 175 may not be present.

In other illustrative examples, number of cavities 148 and number of cavities 154 are not present in layup mandrel 102. In these illustrative examples, number of stiffeners 146 and number of stiffeners 152 are not present as part of curing layup 178.

Further, although not depicted in FIG. 1, any desirable quantity of films or materials may be present on layup mandrel 102 to facilitate processing and removal of composite parts, such as first composite part 166 or second composite part 176. For example, a release film may be present on layup mandrel 102 to provide for release of composite parts after curing. Additionally, any desirable quantity of films or materials may be present on layup mandrel 102 as a cut path in layup mandrel 102. For example, a sacrificial material may be present on layup mandrel 102 where composite material removal equipment 134 operates to remove composite material. When a sacrificial material is present, composite material removal equipment 134 cuts entirely through plurality of composite plies 106 without scoring layup mandrel 102. Thus, when plurality of composite plies 106 is laid up onto layup mandrel 102, plurality of composite plies 106 is either in direct contact with layup mandrel 102 or in direct contact with any desired films or materials on layup mandrel 102. Additionally, when bagging material, such as first bagging material 158 or second bagging material 162 is sealed to layup mandrel 102, the bagging material is either sealed to layup mandrel 102 or any desired films or materials on layup mandrel 102.

Additionally, in some illustrative examples, each of first caul plate 142 and second caul plate 144 may be associated with a removable tool, such as a strong back. A strong back can be used to secure a caul plate, such as first caul plate 142 or second caul plate 144 in place, FIGS. 2-8 illustrate one non-limiting example of fabricating a composite structure in accordance with the illustrative embodiments. FIGS. 2-8 illustrate one non-limiting example of reducing flow time of a layup mandrel in composite fuselage manufacturing.

Figure 2:
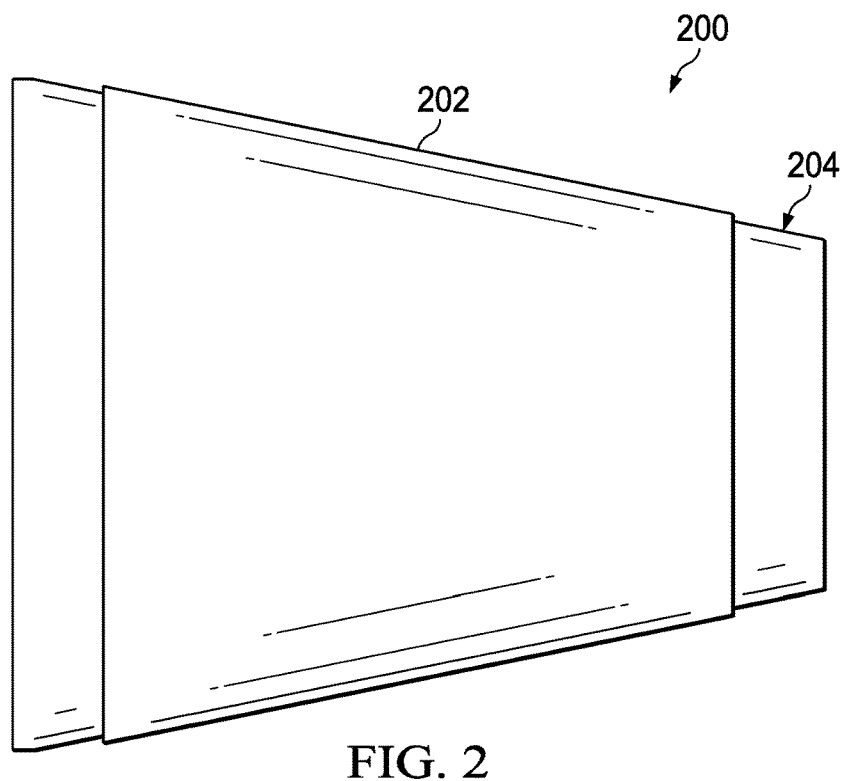
FIG. 2 is an illustration of side view of a plurality of composite plies on a layup mandrel in accordance with an illustrative embodiment.

Turning now to FIG. 2, an illustration of side view of a plurality of composite plies on a layup mandrel is depicted in accordance with an illustrative embodiment. View 200 is a side view of plurality of composite plies 202 on layup mandrel 204. Layup mandrel 204 may a physical implementation of layup mandrel 102 of FIG. 1. Plurality of composite plies 202 may be a physical implementation of plurality of composite plies 106 of FIG. 1.

In some illustrative examples, plurality of composite plies 202 are laid up using an automated fiber placement equipment, such as automated fiber placement equipment 104 of FIG. 1. Plurality of composite plies 202 includes any desirable quantity of layers of composite material. In some illustrative examples, a layup of plurality of composite plies 202 may not be constant across all of plurality of composite plies 202. For example, plurality of composite plies 202 may include ply drops, pad-ups, or any other desirable layup features.

Figure 3:
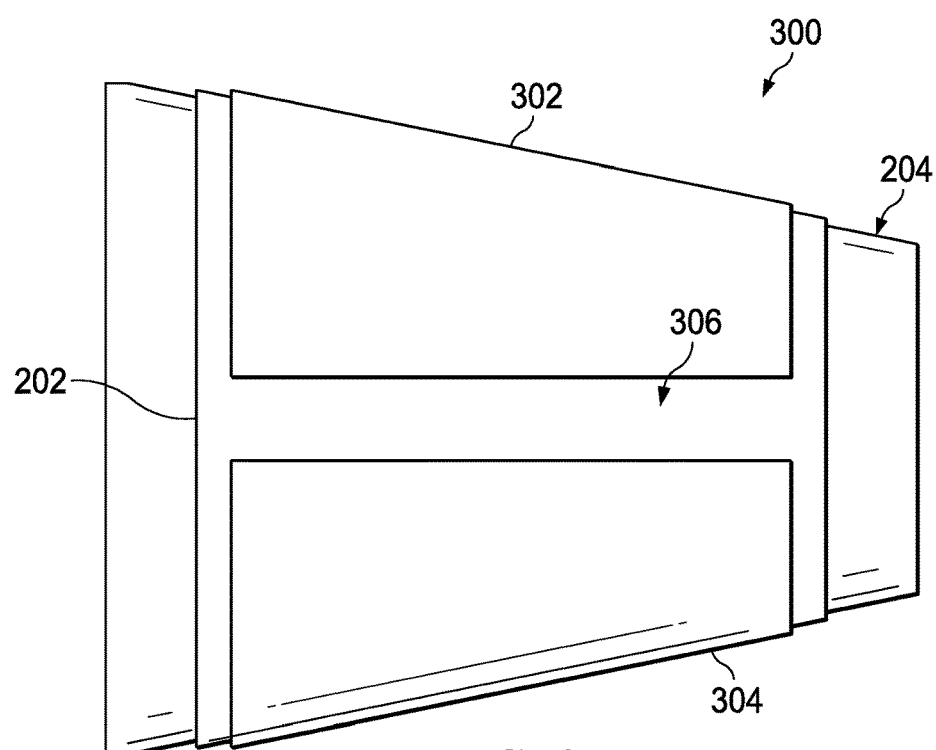
FIG. 3 is an illustration of a side view of a first caul and a second caul over a plurality of composite plies on a layup mandrel in accordance with an illustrative embodiment.

Turning now to FIG. 3, an illustration of a side view of a first caul and a second caul over a plurality of composite plies on a layup mandrel is depicted in accordance with an illustrative embodiment. In view 300, first caul plate 302 and second caul plate 304 have been positioned over plurality of composite plies 202. In view 300, composite material 306 is left exposed.

First caul plate 302 and second caul plate 304 have a desired rigidity for curing plurality of composite plies 202. First caul plate 302 and second caul plate 304 are configured to provide a desirable surface quality to plurality of composite plies 202 during curing.

Figure 4:
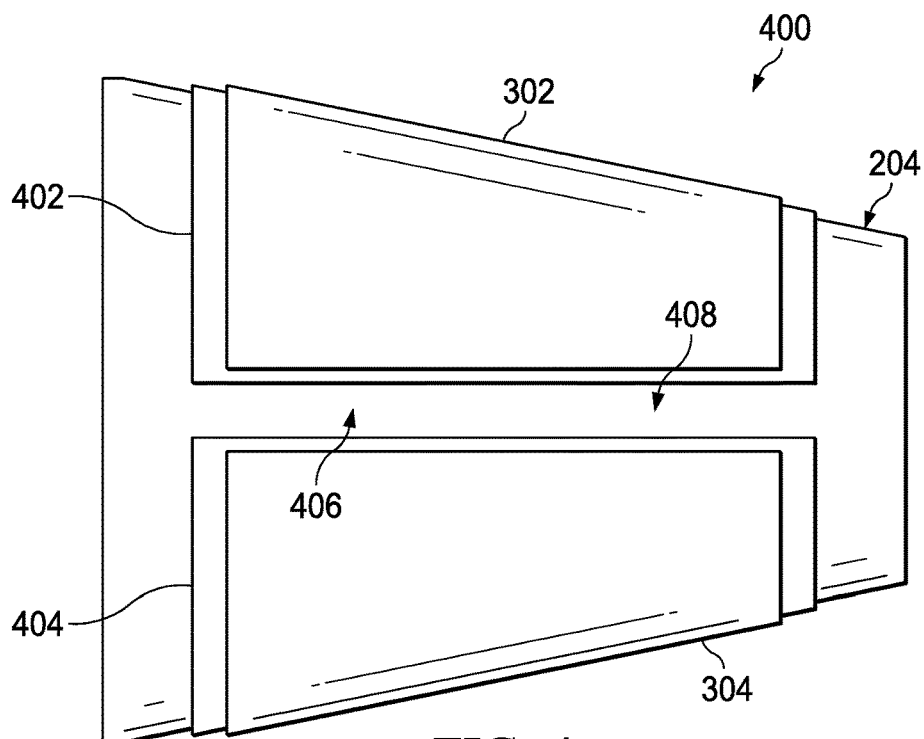
FIG. 4 is an illustration of side view of a first composite section and a second composite section on a layup mandrel in accordance with an illustrative embodiment.

Turning now to FIG. 4, an illustration of side view of a first composite section and a second composite section on a layup mandrel is depicted in accordance with an illustrative embodiment. Between view 300 of FIG. 3 and view 400, at least part of composite material 306 exposed between first caul plate 302 and second caul plate 304 has been removed to separate first composite section 402 from second composite section 404.

By removing composite material from between first composite section 402 and second composite section 404, edge 406 of first composite section 402 is created. By removing composite material from between first composite section 402 and second composite section, edge 408 of second composite section 404 is created.

Although only first composite section 402 and second composite section 404 are visible in view 400, in some illustrative examples additional composite sections may be present on the opposite side of layup mandrel 204.

Figure 5:
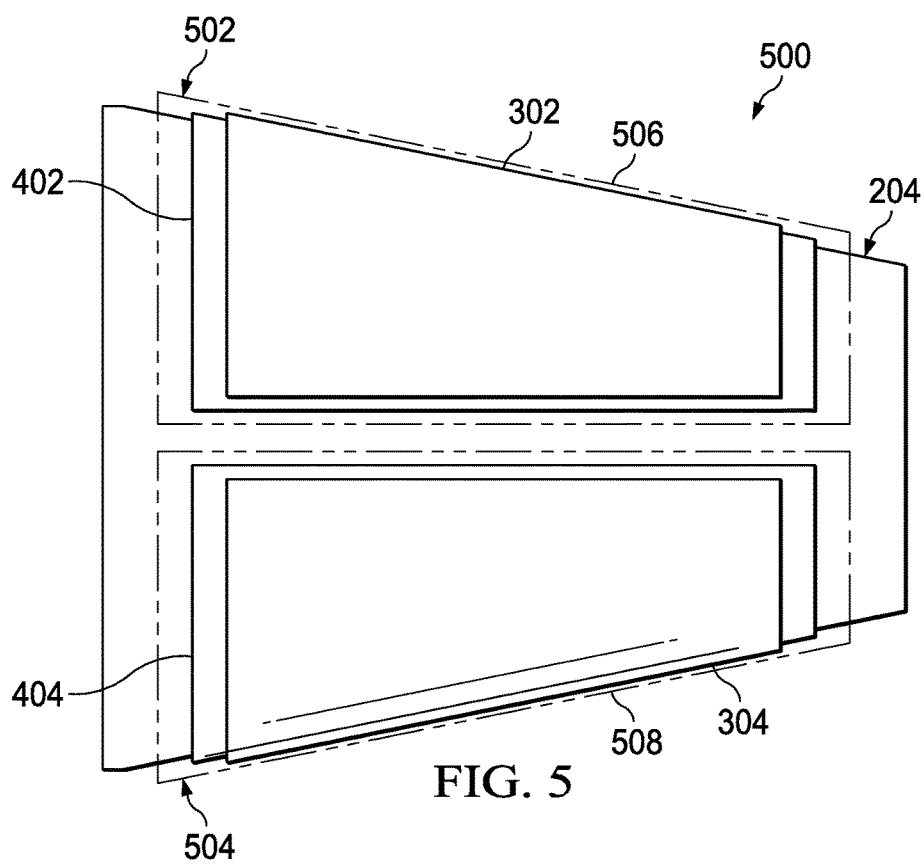
FIG. 5 is an illustration of side view of a first sealed region and a second sealed region on a layup mandrel in accordance with an illustrative embodiment.

Turning now to FIG. 5, an illustration of side view of a first sealed region and a second sealed region on a layup mandrel is depicted in accordance with an illustrative embodiment. In view 500, bagging material has been applied over each of first composite section 402 and second composite section 404. Bagging material 502 has been applied over first composite section 402 and first caul plate 302. Bagging material 504 has been applied over second composite section 404 and second caul plate 304.

Sealing bagging material 502 to layup mandrel 204 forms first sealed region 506. Although not depicted in FIG. 5, first sealed region 506 includes any desirable layers for performing a cure of first composite section 402 in first sealed region 506. In some illustrative examples, damming material is used as edge material against first composite section 402 to reduce or eliminate bag bridging. In some illustrative examples, damming material is used as edge material against first composite section 402 to reduce undesirable end effects of first composite section 402. In other illustrative examples, first sealed region 506 includes a breather layer between bagging material 502 and first composite section 402.

Sealing bagging material 504 to layup mandrel 204 forms second sealed region 508. Although not depicted in FIG. 5, second sealed region 508 includes any desirable layers for performing a cure of second composite section 404 in second sealed region 508. In some illustrative examples, damming material is used as edge material against second composite section 404 to reduce or eliminate bag bridging. In some illustrative examples, damming material is used as edge material against second composite section 404 to reduce undesirable end effects of second composite section 404. In other illustrative examples, second sealed region 508 includes a breather layer between bagging material 504 and second composite section 404.

First sealed region 506 and second sealed region 508 are separate sealed regions. During curing of first composite section 402, vacuum is pulled in first sealed region 506. During curing of second composite section 404, vacuum is pulled in second sealed region 508. Vacuum is pulled on each of first composite section 402 and second composite section 404 separately. Loss of vacuum in one of first sealed region 506 and second sealed region 508 will not undesirably affect the other of first sealed region 506 and second sealed region 508.

FIG. 5 is non-limiting implementation. In some illustrative examples, a single sealed region includes both first composite section 402 and second composite section 404.

Figure 6:
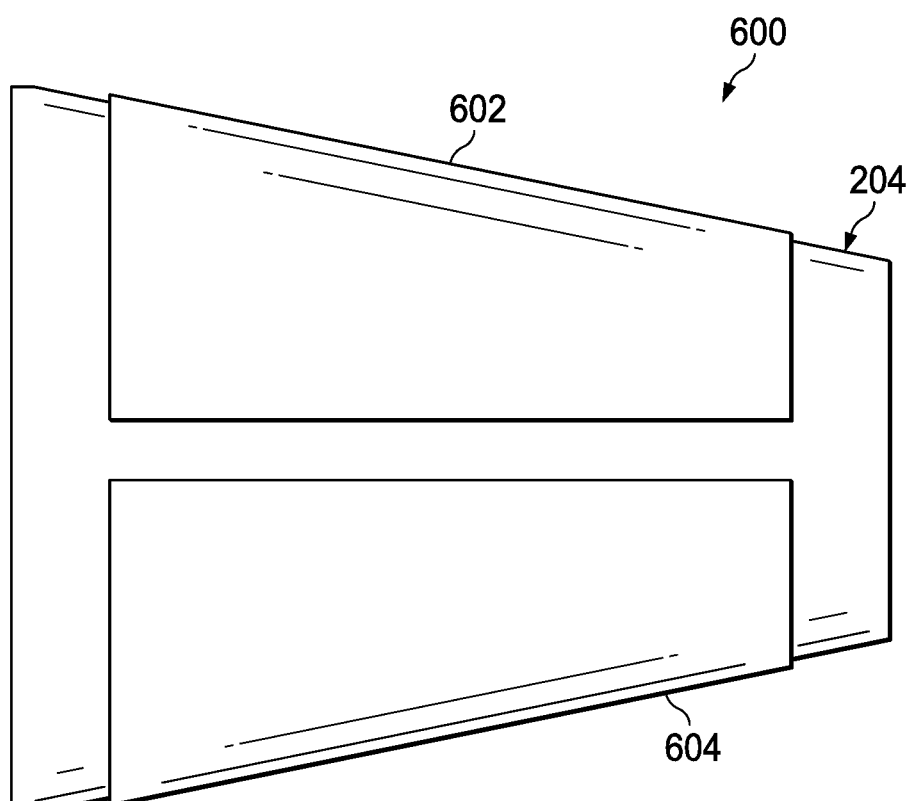
FIG. 6 is an illustration of side view of a first composite part and a second composite part after curing on a layup mandrel in accordance with an illustrative embodiment.

Turning now to FIG. 6, an illustration of side view of a first composite part and a second composite part after curing on a layup mandrel is depicted in accordance with an illustrative embodiment. In view 600, materials for curing first composite section 402 and second composite section 404 have been removed. For example, each of bagging material 502, bagging material 504, first caul plate 302, and second caul plate 304 have been removed. Any additional materials used, such as breather films and damming materials, have also been removed in view 600.

In view 600, first composite section 402 has been cured to form first composite part 602. In view 600, second composite section 404 has been cured to form second composite part 604.

Figure 7:
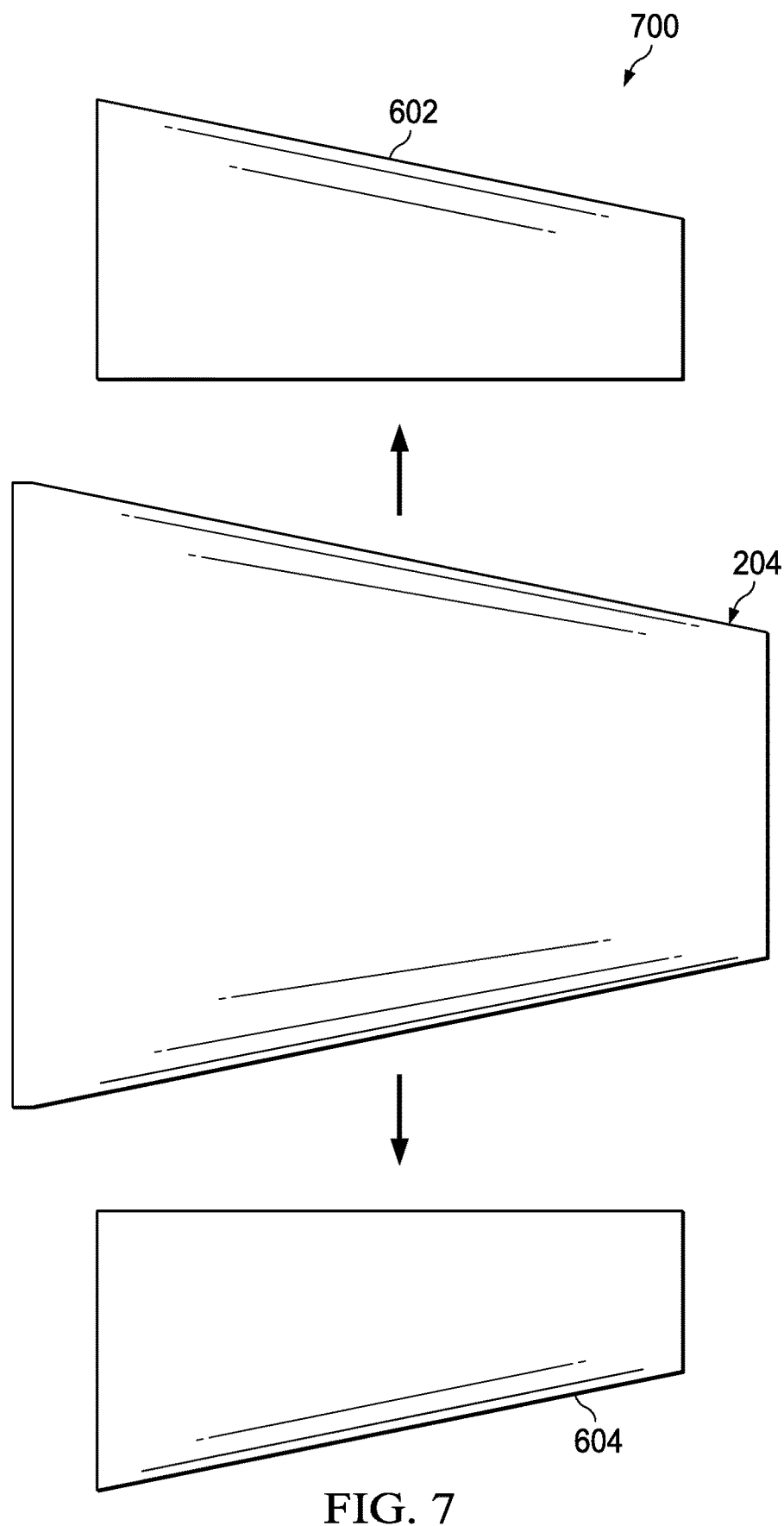
FIG. 7 is an illustration of side view of a first composite part and a second composite part being removed from a layup mandrel after curing and prior to performing a post cure machining operation in accordance with an illustrative embodiment.

Turning now to FIG. 7, an illustration of side view of a first composite part and a second composite part being removed from a layup mandrel after curing and prior to performing a post cure machining operation is depicted in accordance with an illustrative embodiment. In view 700, first composite part 602 and second composite part 604 are lifted from layup mandrel 204. First composite part 602 and second composite part 604 are removed from layup mandrel 204 after curing but prior to performing a post-cure machining operation on either first composite part 602 or second composite part 604.

Figure 8:
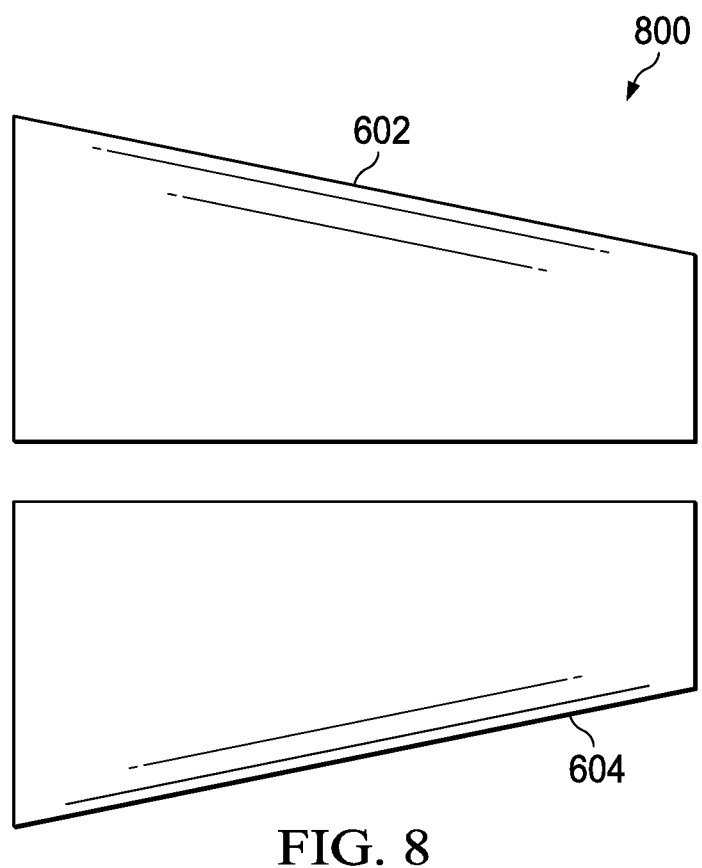
FIG. 8 is an illustration of side view of a first composite part and a second composite part configured to be joined in accordance with an illustrative embodiment.

Turning now to FIG. 8, an illustration of side view of a first composite part and a second composite part configured to be joined is depicted in accordance with an illustrative embodiment. View 800 depicts first composite part 602 and second composite part 604 off of layup mandrel 204 of FIG. 2. To perform trimming and machining operations on first composite part 602 and second composite part 604, first composite part 602 and second composite part 604 are transferred to respective machining support tools.

Post cure operations are performed on first composite part 602 and second composite part 604 to prepare first composite part 602 and second composite part 604 for joining. In some illustrative examples, performing post cure operations includes at least one of drilling or trimming on first composite part 602 and second composite part 604 after removing first composite part 602 and second composite part 604 from layup mandrel 204.

Figure 9:
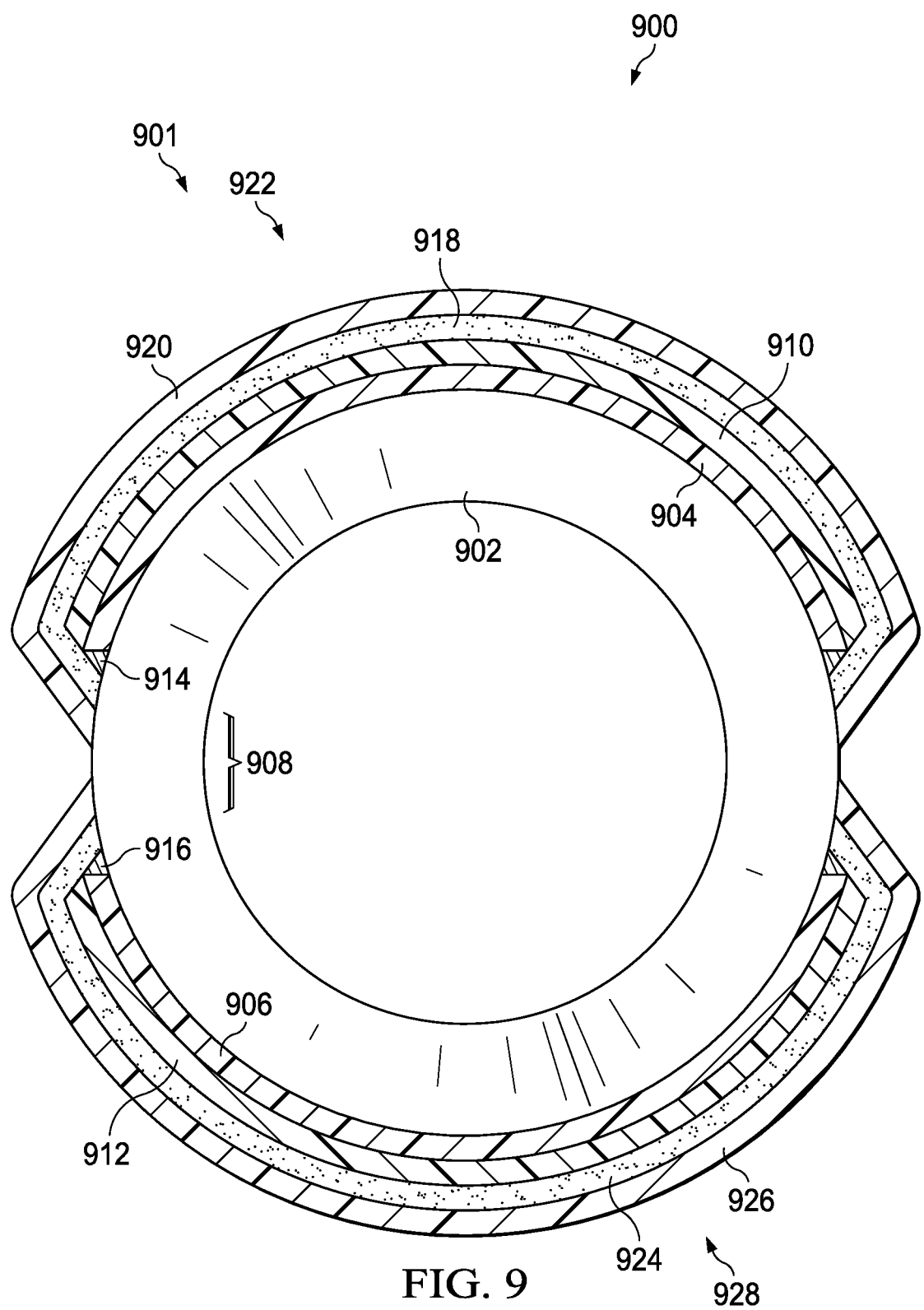
FIG. 9 is an illustration of a cross-sectional view of a first sealed region and a second sealed region on a layup mandrel in accordance with an illustrative embodiment.

Turning now to FIG. 9, an illustration of a cross-sectional view of a first sealed region and a second sealed region on a layup mandrel is depicted in accordance with an illustrative embodiment. View 900 is a cross-sectional view of a physical implementation of first sealed region 160 and second sealed region 164 on layup mandrel 102 of FIG. 1. In some illustrative examples, view 900 is a cross-sectional view of first sealed region 506 and second sealed region 508 on layup mandrel 204 from FIG. 5.

In view 900 of manufacturing environment 901, first composite section 904 and second composite section 906 are present on layup mandrel 902. Transition 908 of mandrel is between first composite section 904 and second composite section 906. The uncured material laid up on transition 908 has been removed from layup mandrel 902.

First caul plate 910 is positioned over first composite section 904. Second caul plate 912 is positioned over second composite section 906. Edge material 914 is positioned against first composite section 904. Edge material 916 is positioned against second composite section 906. Edge material 914 and edge material 916 are present to reduce undesirable end effects to first composite section 904 and second composite section 906 during curing.

Breather material 918 is positioned between first bagging material 920 and first caul plate 910. First bagging material 920 is sealed over first composite section 904 to layup mandrel 902 to form first sealed region 922. A vacuum is pulled under first bagging material 920 during curing of first composite section 904. First composite section 904 is cured to form a first composite part.

Breather material 924 is positioned between second bagging material 926 and second caul plate 912. Second bagging material 926 is sealed over second composite section 906 to layup mandrel 902 to form second sealed region 928. A vacuum is pulled under second bagging material 926 during curing of second composite section 906. Second composite section 906 is cured to form a second composite part.

FIG. 9 is not meant to imply any architectural limitations to the manner in which an illustrative embodiment may be implemented. For example, several of the components of first sealed region 922 may not be present, be combined, or have different dimensions than those depicted. For example, breather material 918 may not extend across all of first caul plate 910. As another example, first bagging material 920 may be a portion of first caul plate 910. As yet another example, a same bagging material may extend over both first caul plate 910 and second caul plate 912. In this example, the same bagging material may be sealed to transition 908. In some illustrative examples, edge material 914 and edge material 916 may not be present. For example, if first composite section 904 and second composite section 906 are cut at an angle, edge material 914 and edge material 916 may not be used. Many modifications and variations to the layers of vacuum materials applied for curing processes will be apparent to those of ordinary skill in the art.

Figure 10:
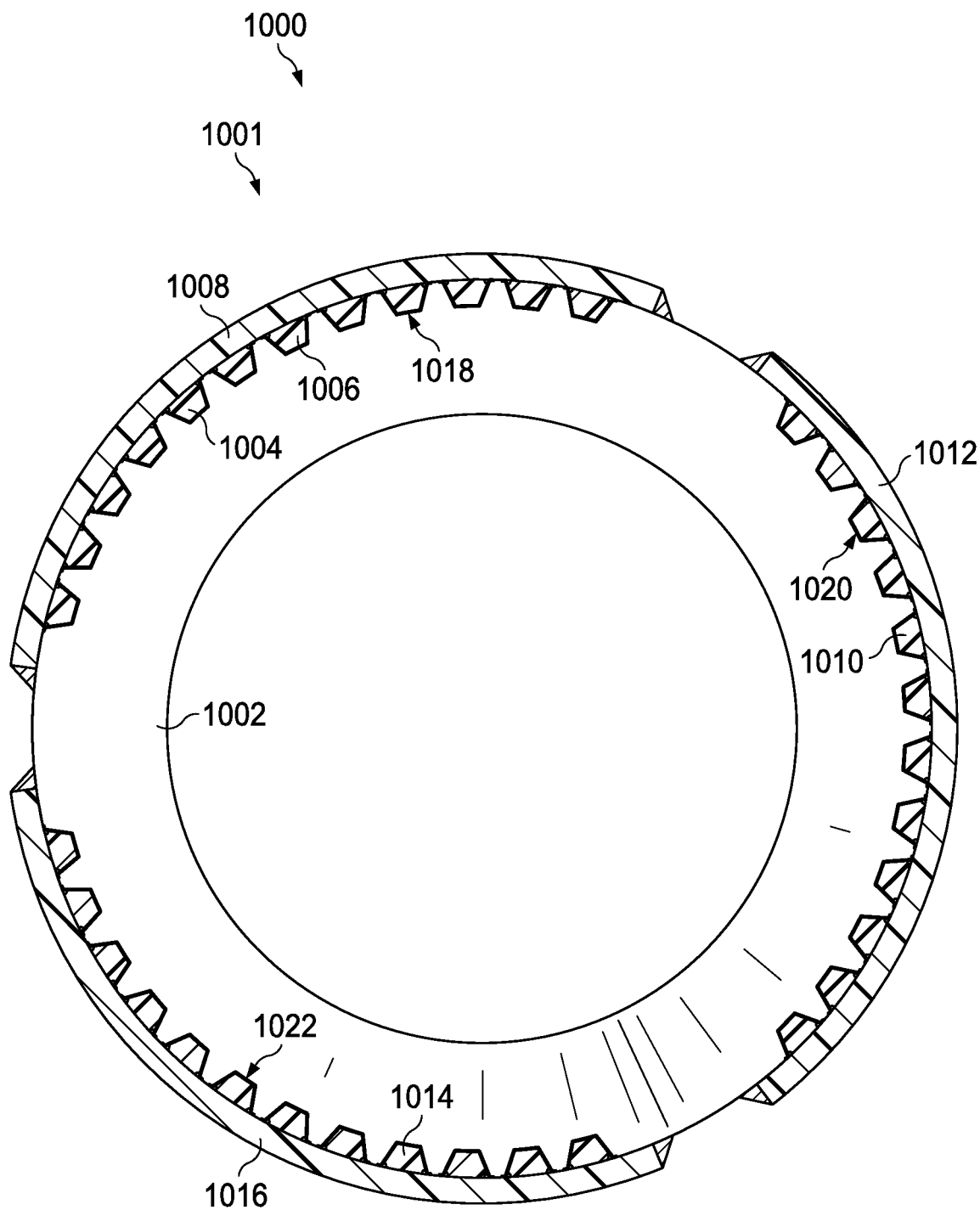
FIG. 10 is an illustration of a cross-sectional view of a plurality of composite sections on a layup mandrel in accordance with an illustrative embodiment.

Turning now to FIG. 10, an illustration of a cross-sectional view of a plurality of composite sections on a layup mandrel is depicted in accordance with an illustrative embodiment. View 1000 is a cross-sectional view of a physical implementation of curing layup 178 of FIG. 1. In some illustrative examples, view 1000 may be a cross-sectional view of first composite section 402, second composite section 404, and layup mandrel 204 of FIGS. 4-6 if layup mandrel 204 includes cavities.

In view 1000 of manufacturing environment 1001, layup mandrel 1002 has cavities 1004 including number of cavities 1006 under first composite section 1008, number of cavities 1010 under second composite section 1012, and number of cavities 1014 under third composite section 1016. Number of stiffeners 1018 is present in number of cavities 1006. Number of stiffeners 1020 is present in number of cavities 1010. Number of stiffeners 1022 is present in number of cavities 1014.

As depicted, each stiffener of number of stiffeners 1018, number of stiffeners 1020, and number of stiffeners 1022 has a trapezoidal cross-section. As depicted, each stiffener of number of stiffeners 1018, number of stiffeners 1020, and number of stiffeners 1022 has a respective number of composite charges, a number of radius fillers, and a support.

To cure first composite section 1008, second composite section 1012, and third composite section 1016, bagging material is placed over each of first composite section 1008, second composite section 1012, and third composite section 1016. In some illustrative examples, first composite section 1008, second composite section 1012, and third composite section 1016 are bagged together. In other illustrative examples, at least one of first composite section 1008, second composite section 1012, or third composite section 1016 may be individually sealed within its own sealed region by its own respective bagging material.

After curing, the respective composite part formed from each of first composite section 1008, second composite section 1012, and third composite section 1016 can be removed without a post-cure trim. After curing, each support within number of stiffeners 1018, number of stiffeners 1020, and number of stiffeners 1022 may be removed after a respective composite part formed from first composite section 1008, second composite section 1012, and third composite section 1016 is removed from layup mandrel 1002.

For example, supports may be removed from number of stiffeners 1018 after removing a first composite part from layup mandrel 1002.

Figure 11A:
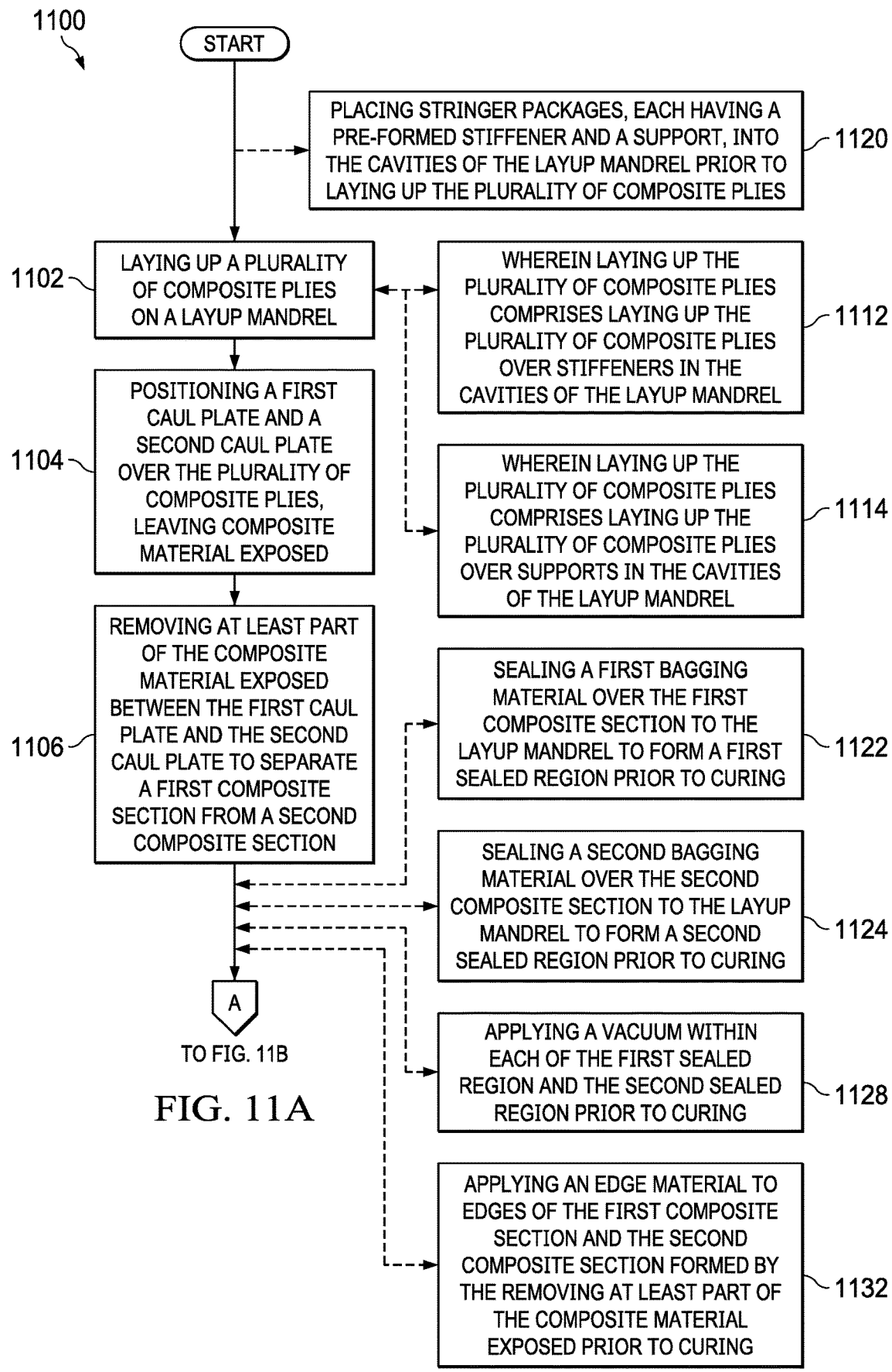
FIGS. 11A-11B are an illustration of a flowchart of a method of fabricating a composite structure in accordance with an illustrative embodiment.
Figure 11B:
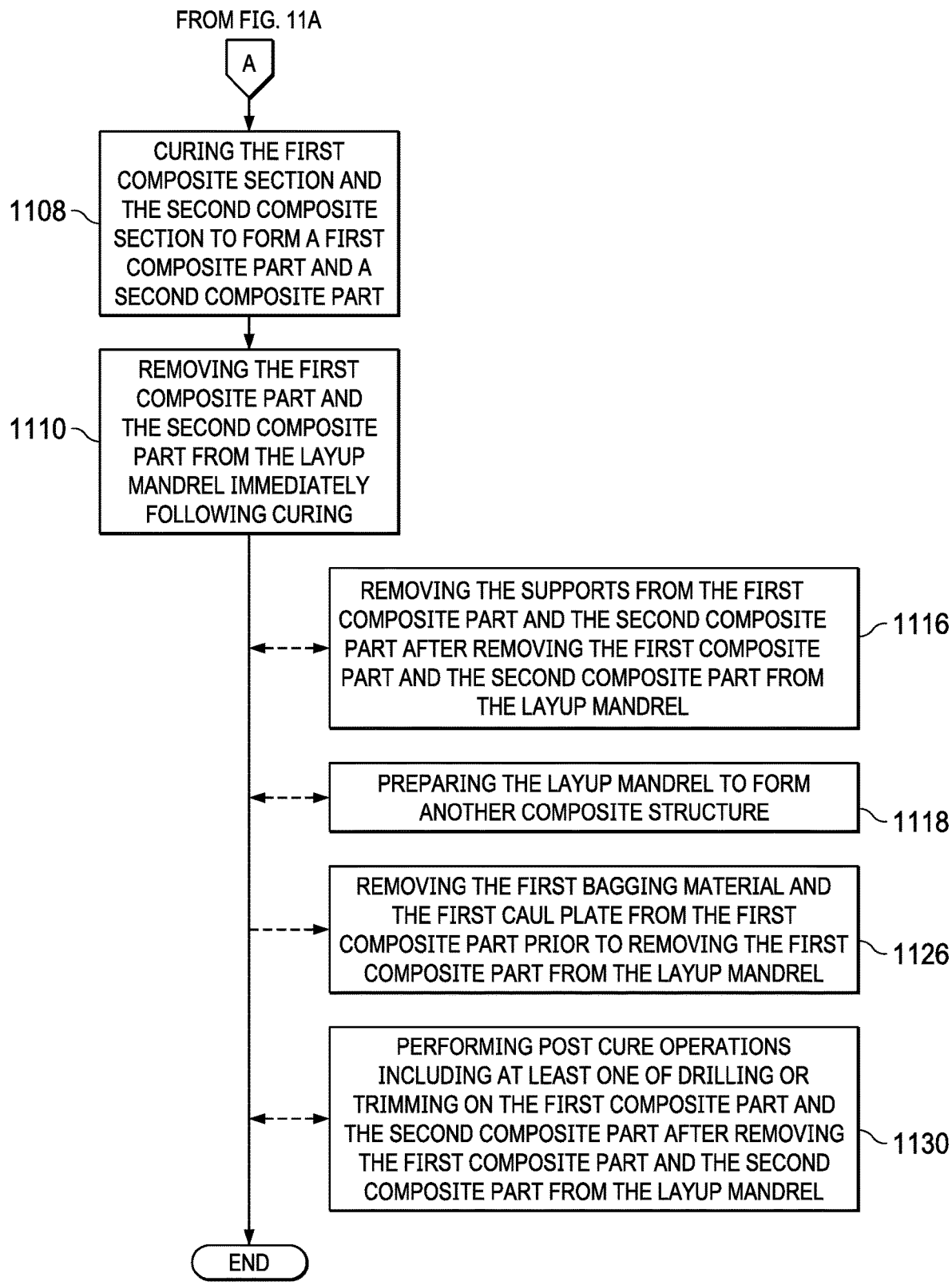

Turning now to FIGS. 11A-11B, an illustration of a flowchart of a method of fabricating a composite structure is depicted in accordance with an illustrative embodiment. Method 1100 may be implemented in manufacturing environment 100 of FIG. 1. Method 1100 may be implemented to fabricate composite structure 108 of FIG. 1. Some operations of method 1100 may be seen in the illustrations of at least one of FIGS. 2-9. Method 1100 may be implemented in manufacturing environment 901 of view 900 of FIG. 9. Method 1100 may be implemented in manufacturing environment 1001 of FIG. 10.

Method 1100 lays up a plurality of composite plies over a layup mandrel (operation 1102). In some illustrative examples, method 1100 lays up the plurality of composite plies using automated fiber placement equipment. In some illustrative examples, the automated fiber placement equipment lays up composite material around the whole of the layup mandrel without starts and stops.

Method 1100 positions a first caul plate and a second caul plate over the plurality of composite plies, leaving composite material exposed (operation 1104). Method 1100 removes at least part of the composite material exposed between the first caul plate and the second caul plate to separate a first composite section from a second composite section (operation 1106).

Method 1100 cures the first composite section and the second composite section to form a first composite part and a second composite part (operation 1108). First composite part and second composite part have any desirable size or shape. In some illustrative examples, the first composite part and the second composite part are portions of a composite structure. In some illustrative examples, the first composite part is a first half of the fuselage and the second composite part is a second half of the fuselage.

Method 1100 removes the first composite part and the second composite part from the layup mandrel immediately following curing (operation 1110). Afterwards, method 1100 terminates.

In some illustrative examples, laying up the plurality of composite plies comprises laying up the plurality of composite plies over stiffeners in cavities of the layup mandrel (operation 1112). In some illustrative examples, laying up the plurality of composite plies comprises laying up the plurality of composite plies over supports in the cavities of the layup mandrel (operation 1114). The supports take the form of a bladder, a mandrel, or any other desirable form of support used to maintain a shape of the stiffeners during curing. In some of these illustrative examples, method 1100 further comprises removing the supports from the first composite part and the second composite part after removing the first composite part and the second composite part from the layup mandrel (operation 1116).

In some illustrative examples, method 1100 prepares the layup mandrel to form another composite structure (operation 1118). Because the first composite part and the second composite part from the layup mandrel immediately following curing, operators do not have to wait for post cure trimming and drilling on the first composite part or the second composite part to begin preparing the layup mandrel for forming another composite part. The layup mandrel may be prepared for forming another composite structure as the post cure operations are performed. Thus, down time for the layup mandrel is reduced.

In some illustrative examples, method 1100 places stringer packages, each having a pre-formed stiffener and a support, into cavities of the layup mandrel prior to laying up the plurality of composite plies (operation 1120). In other illustrative examples, each stiffener is built up within a respective cavity of the cavities in the layup mandrel prior to laying up the plurality of composite plies.

In some illustrative examples, method 1100 seals a first bagging material over the first composite section to the layup mandrel to form a first sealed region prior to curing (operation 1122); and seals a second bagging material over the second composite section to the layup mandrel to form a second sealed region prior to curing (operation 1124). In these illustrative examples, first composite section and second composite section have vacuum drawn on them independently.

In some of these illustrative examples, method 1100 removes the first bagging material and the first caul plate from the first composite part prior to removing the first composite part from the layup mandrel (operation 1126). In some of these illustrative examples, method 1100 applies a vacuum within each of the first sealed region and the second sealed region prior to curing (operation 1128).

In some other illustrative examples, the first composite section and the second composite section are instead sealed within a same sealed region. When the first composite section and the second composite section are sealed together, a bagging material is sealed over both the first composite section and the second composite section.

In some illustrative examples, method 1100 performs post cure operations including at least one of drilling or trimming on the first composite part and the second composite part after removing the first composite part and the second composite part from the layup mandrel (operation 1130). In some illustrative examples, method 1100 applies an edge material to edges of the first composite section and the second composite section formed by the removing of the at least part of the composite material exposed prior to curing (operation 1132).

Figure 12:
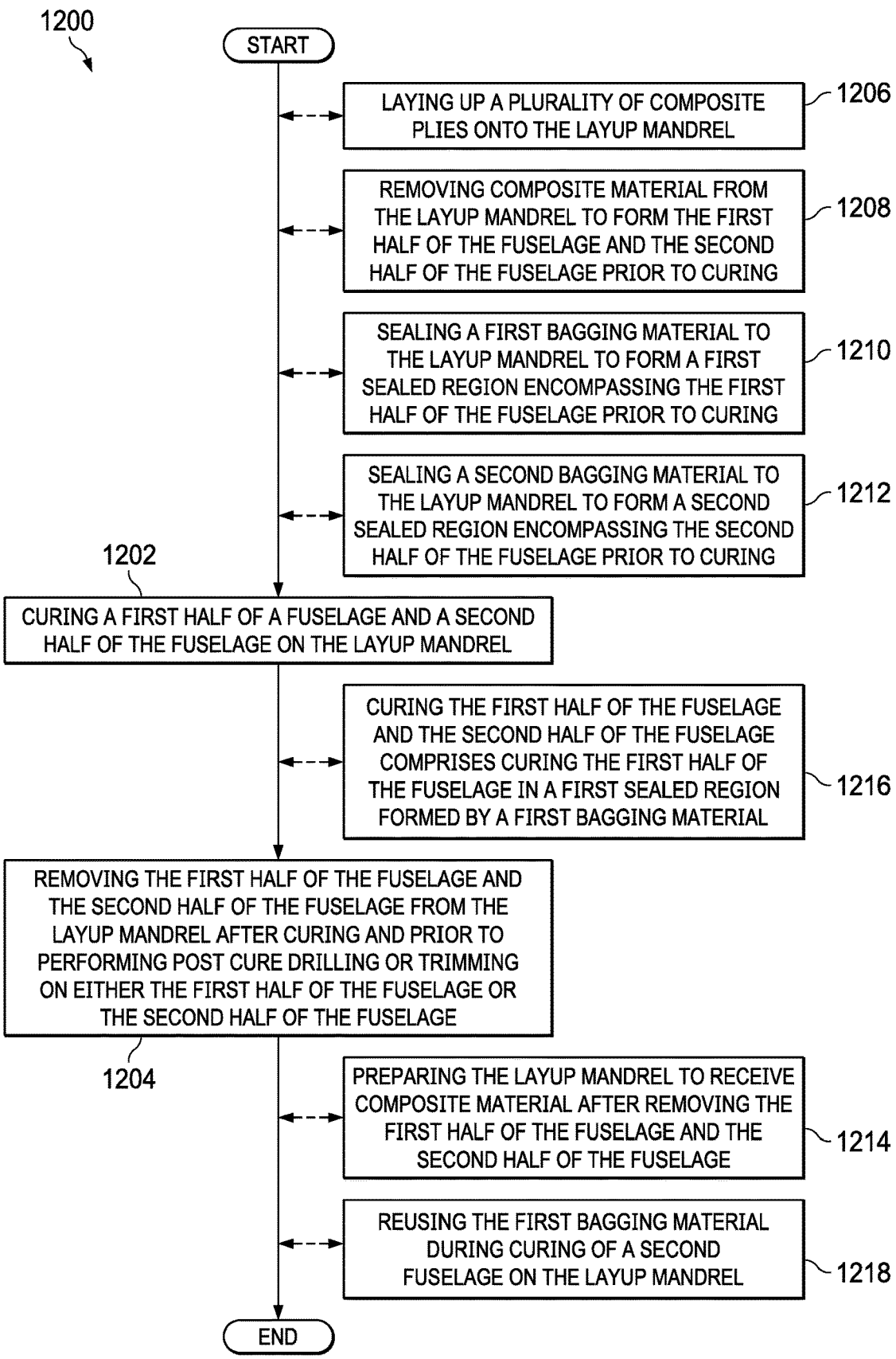
FIG. 12 is an illustration of a flowchart of a method of reducing flow time of a layup mandrel in composite fuselage manufacturing in accordance with an illustrative embodiment.

Turning now to FIG. 12, an illustration of a flowchart of a method of reducing flow time of a layup mandrel in composite fuselage manufacturing is depicted in accordance with an illustrative embodiment. Method 1200 may be implemented in manufacturing environment 100 of FIG. 1. Method 1200 may be implemented to fabricate composite structure 108 of FIG. 1. Some operations of method 1200 may be seen in the illustrations of at least one of FIGS. 2-9. Method 1200 may be implemented in manufacturing environment 901 of FIG. 9. Method 1200 may be implemented in manufacturing environment 1001 of FIG. 10.

Method 1200 cures a first half of a fuselage and a second half of the fuselage on the layup mandrel (operation 1202). Method 1200 removes the first half of the fuselage and the second half of the fuselage from the layup mandrel after curing and prior to performing post cure drilling or trimming on either the first half of the fuselage or the second half of the fuselage (operation 1204). Afterwards, method 1200 terminates.

In some illustrative examples, method 1200 further comprises laying up a plurality of composite plies onto the layup mandrel (operation 1206), and removing composite material from the layup mandrel to form the first half of the fuselage and the second half of the fuselage prior to curing (operation 1208).

In some illustrative examples, method 1200 seals a first bagging material to the layup mandrel to form a first sealed region encompassing the first half of the fuselage prior to curing (operation 1210), and seals a second bagging material to the layup mandrel to form a second sealed region encompassing the second half of the fuselage prior to curing (operation 1212). By forming a first sealed region and a second sealed region, vacuum is drawn on each of the first half of the fuselage and the second half of the fuselage separately.

In some illustrative examples, method 1200 prepares the layup mandrel to receive composite material after removing the first half of the fuselage and the second half of the fuselage (operation 1214). By removing the first half of the fuselage and the second half of the fuselage from the layup mandrel prior to post-cure operations being performed on the first half of the fuselage and the second half of the fuselage, mandrel cycle time is reduced. For example, the preparation time for the mandrel is reduced when post-cure drilling and trimming is performed on the first half of the fuselage and the second half of the fuselage off of the mandrel. As another example, the layup mandrel may be recycled into the production line prior to performing the post-cure operations on the first half of the fuselage and the second half of the fuselage.

In some illustrative examples, curing the first half of the fuselage and the second half of the fuselage comprises curing the first half of the fuselage in a first sealed region formed by a first bagging material (operation 1216). In some of these illustrative examples, method 1200 reuses the first bagging material during curing of a second fuselage on the layup mandrel (operation 1218).

Figure 13:
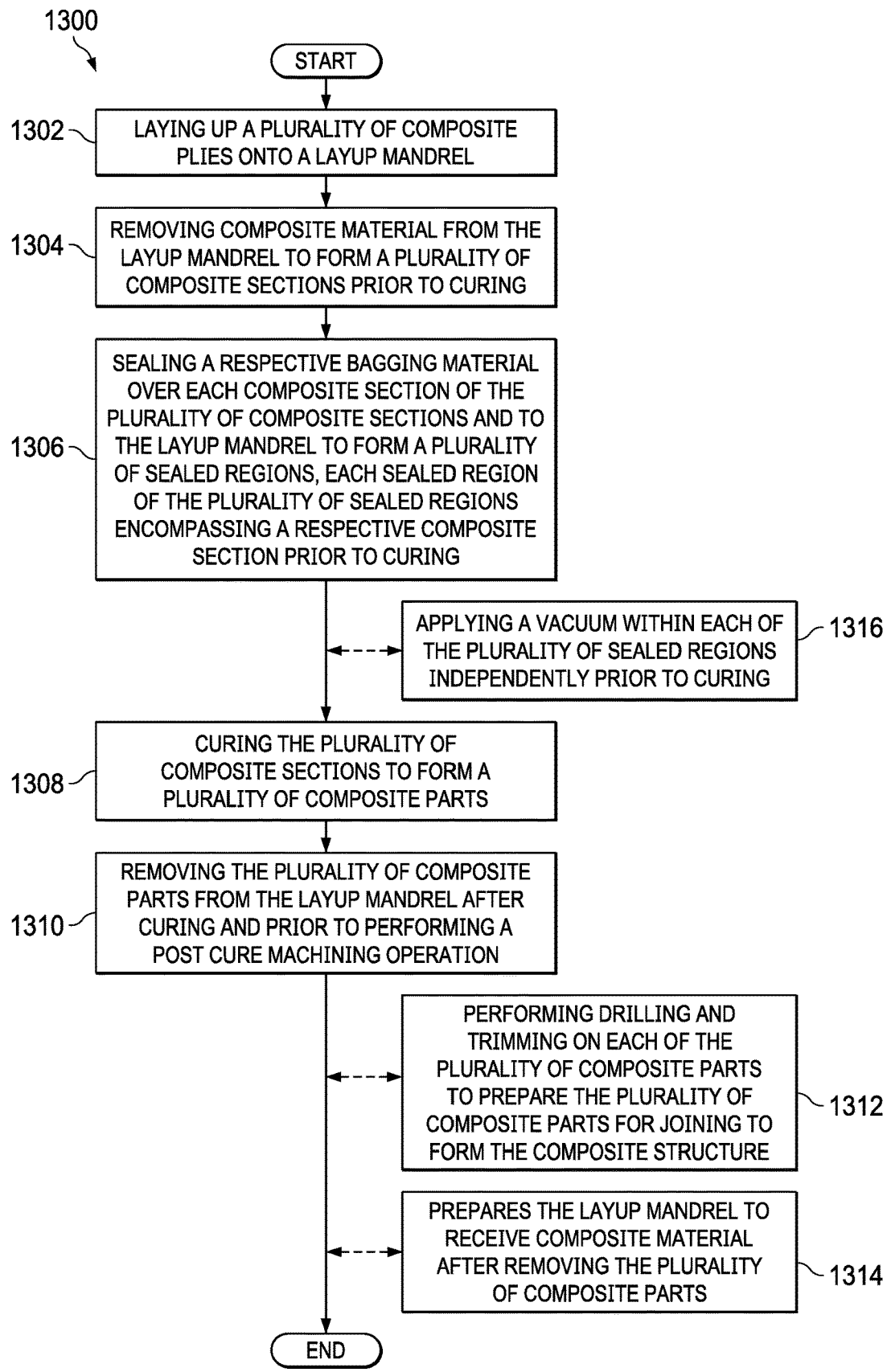
FIG. 13 is an illustration of a flowchart of a method of fabricating a composite structure in accordance with an illustrative embodiment.

Turning now to FIG. 13, an illustration of a flowchart of a method of fabricating a composite structure is depicted in accordance with an illustrative embodiment. Method 1300 may be implemented in manufacturing environment 100 of FIG. 1. Method 1300 may be implemented to fabricate composite structure 108 of FIG. 1. Some operations of method 1300 may be seen in the illustrations of at least one of FIGS. 2-9. Method 1300 may be implemented in manufacturing environment 901 of FIG. 9. Method 1300 may be implemented in manufacturing environment 1001 of FIG. 10.

Method 1300 lays up a plurality of composite plies onto a layup mandrel (operation 1302). Method 1300 removes composite material from the layup mandrel to form a plurality of composite sections prior to curing (operation 1304). Method 1300 seals a respective bagging material over each composite section of the plurality of composite sections and to the layup mandrel to form a plurality of sealed regions, each sealed region of the plurality of sealed regions encompassing a respective composite section prior to curing (operation 1306). Method 1300 cures the plurality of composite sections to form a plurality of composite parts (operation 1308). Method 1300 removes the plurality of composite parts from the layup mandrel after curing and prior to performing a post cure machining operation (operation 1310). Afterwards, method 1300 terminates.

In some illustrative examples, method 1300 performs drilling and trimming on each of the plurality of composite parts to prepare the plurality of composite parts for joining to form the composite structure (operation 1312). In some illustrative examples, method 1300 prepares the layup mandrel to receive composite material after removing the plurality of composite parts (operation 1314). By removing the plurality of composite parts from the layup mandrel prior to performing any post cure machining operations on the plurality of composite parts, the layup mandrel can be prepared to receive composite material at least one of while or before post cure machining operations are performed on the plurality of composite parts.

In some illustrative examples, method 1300 applies a vacuum within each of the plurality of sealed regions independently prior to curing (operation 1316). By applying vacuum independently to each of the plurality of sealed regions, pressure within one of the plurality of sealed regions will only affect the composite section within the respective region. For example, pressure within a first sealed region will only affect the first composite section within the first sealed region.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operations 1112 through 1132 of FIG. 11 may be optional. As another example, operations 1206 through 1218 of FIG. 12 may be optional. As a further example, operation 1312 of FIG. 13 may be optional.

Figure 14:
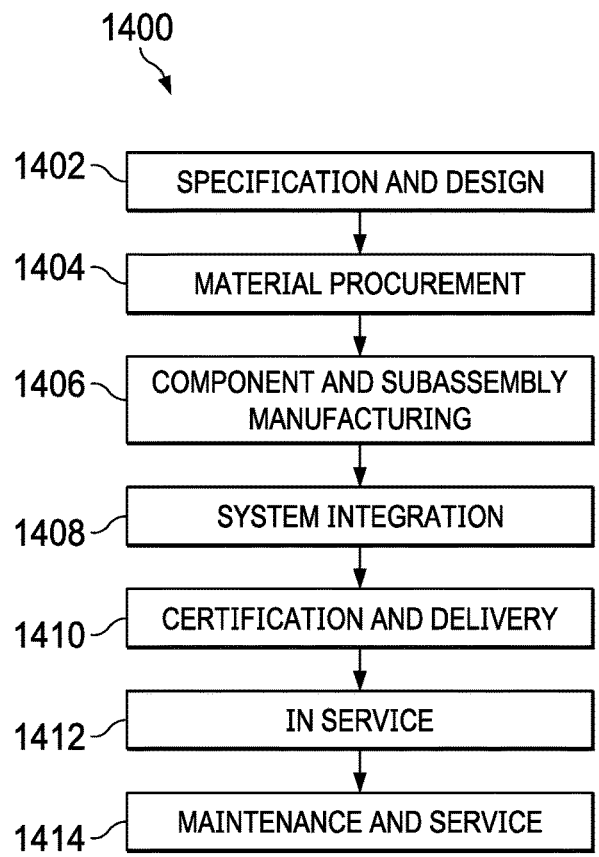
FIG. 14 is an illustration of an aircraft manufacturing and service method in a form of a block diagram in accordance with an illustrative embodiment.
Figure 15:
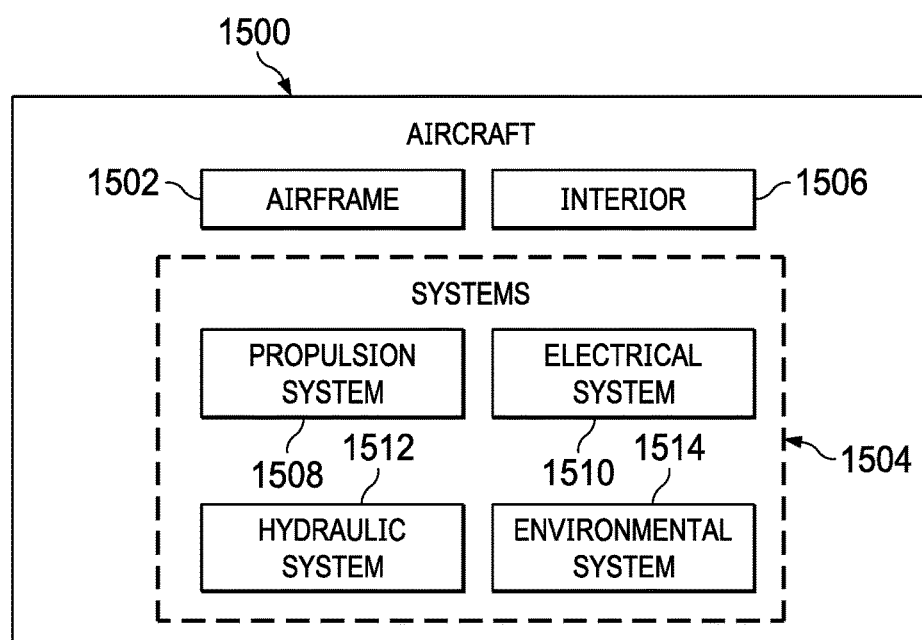
FIG. 15 is an illustration of an aircraft in a form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 of FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400. One or more illustrative embodiments may be used during at least one of component and subassembly manufacturing 1406, system integration 1408, or maintenance and service 1414 of FIG. 14. For example, the illustrative examples be used during component and subassembly manufacturing 1406 to form fuselage 110. As an example, at least one of method 1100, method 1200, or method 1300 may be used during component and subassembly manufacturing 1406 to form fuselage 110. As another illustrative example, composite structure 108 may be manufactured as a component for use in maintenance and service 1414. At least one of method 1100, method 1200, or method 1300 may be used to manufacture portions of aircraft 1500 such as airframe 1502 or portions of interior 1506.

The illustrative examples reduce flow time on the layup mandrel by reducing the quantity of operations performed on layup mandrel. The illustrative examples reduce flow time on the layup mandrel by performing a trimming operation on the composite material prior to cure. Reducing flow time on the layup mandrel is a component of high-rate composite fuselage tooling cost reduction.

The reduction in mandrel flow time through the factory provides cost-saving improvements within aircraft fuselage fabrication. The illustrative examples provide an opportunity to significantly reduce flow time of the mandrel. In some illustrative examples, the methods may reduce the flow time of the layup mandrel by a minimum of two days.

The illustrative examples provide methods to reduce mandrel flow. For the current manufacturing rates a reduction in flow can considerably reduce the number of mandrels to meet production goals. The cost savings of these illustrative examples is significant.

The illustrative examples introduce an uncured composite material removal step. The uncured composite material removal step allows for removal of the cured composite parts earlier than in a conventional manufacturing process. The illustrative examples relocate post-cure operations off of the layup mandrel. The illustrative examples relocate conventional post-cure operations currently performed on the part to different and potentially less expensive tools than the layup mandrel. The illustrative examples enable a layup mandrel to be recycled to the next production part faster than a conventional process.

The illustrative examples enable the removal of the composite parts from the cure mandrel without undergoing a post cure trim operation. The illustrative examples enable the removal of the plurality of composite parts from the layup mandrel without full trim and drill of the longitudinal cut. The illustrative examples enable bladder removal from the composite parts while the composite parts are off the mandrel.

The illustrative examples provide several advantages. The illustrative examples recycle the mandrel back into the production flow significantly faster. The illustrative examples may also reduce the risk of loss of vacuum to multiple parts during cure. The illustrative examples also present bagging improvements.

For example, the illustrative examples provide an ability to bag directly to the layup mandrel. The illustrative examples open up more options for faster bagging process and higher rate production systems. The illustrative examples simplify the bagging process by bagging directly to the mandrel surface from the caul around the entire perimeter. Individually bagging each of the composite sections enables the use of reusable bagging structures. The illustrative examples provide an ability to bag at faster rates with reusable caul/mandrel interfaces by clearing away the uncured composite material between the plurality of composite sections.

The illustrative examples provide benefit to manufacturing cycle time without changing the post-curing operations performed on composite parts and without changing the composite layup process. The illustrative examples provide automated tape or fiber placement on the full mandrel while reducing cycle time. Providing automated tape or fiber placement on the full mandrel enables maximization of tape or fiber placement speeds with machine running at optimized speeds rather than starts and stops. The illustrative examples also do not increase a quantity of tape or fiber placement heads to reduce cycle time. The same quantity of tape or fiber placement heads used in the composite layup process may still be used while cycle time is reduced.

The illustrative examples may also reduce the risk of loss of vacuum to multiple parts during cure. In some of the illustrative examples, the composite sections are individually sealed in bagging materials. By individually sealing each composite section, the risk to other composite sections on the layup mandrel is reduced. By bagging multiple parts together on one layup mandrel a pressure beneath the bagging material will affect each part within the sealed region. By separately bagging the composite sections on the same layup mandrel, if pressure is under one of the bagging materials, the pressure affects only the composite section beneath the affected bagging material. Even if one composite section is undesirably affected, the remaining composite sections on the layup mandrel may still have desirable quality.

The illustrative examples reduce mandrel flow time by reducing time spent by the mandrel in several post-cure steps. The illustrative examples enable the removal of the composite parts from the layup mandrel without undergoing a post cure trim operation. The illustrative examples enable the composite parts undergoing bladder or other support removal off of the layup mandrel.

The illustrative examples also enable the reduction of mandrel preparation post cure. The illustrative examples enable reduction or elimination of groove fill and hole potting of the layup mandrel as it re-enters the production cycle. By performing post-cure drilling and trimming off of the layup mandrel, grooves may not be machining into the layup mandrel during the post-cure drilling and trimming.

Thus, the illustrative examples would reduce or eliminate the amount of groove filler used during the mandrel preparation activity.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating a composite structure, the method comprising:
    laying up a plurality of composite plies over a layup mandrel;
    positioning a first caul plate and a second caul plate over the plurality of composite plies while the plurality of composite plies is on the layup mandrel, leaving a portion of the plurality of composite plies exposed between the first caul plate and the second caul plate;
    removing at least part of the portion of the plurality of composite plies exposed between the first caul plate and the second caul plate to separate a first composite section positioned on the layup mandrel under the first caul plate from a second composite section positioned on the layup mandrel under the second caul plate prior to curing the first composite section and the second composite section;
    curing the first composite section and the second composite section while the first composite section and the second composite section are on the layup mandrel to form a first composite part and a second composite part; and
    removing the first composite part and the second composite part from the layup mandrel immediately following curing and prior to performing any post cure operations on the first composite part or the second composite part.

2. The method of claim 1, wherein laying up the plurality of composite plies comprises laying up the plurality of composite plies over stiffeners in cavities of the layup mandrel.

3. The method of claim 2, wherein laying up the plurality of composite plies comprises laying up the plurality of composite plies over supports in the cavities of the layup mandrel, the method further comprising:
    removing the supports from the first composite part and the second composite part after removing the first composite part and the second composite part from the layup mandrel.

4. The method of claim 1 further comprising:
    preparing the layup mandrel to form another composite structure.

5. The method of claim 1 further comprising:
    placing stringer packages, each having a pre-formed stiffener and a support, into cavities of the layup mandrel prior to laying up the plurality of composite plies.

6. The method of claim 1 further comprising:
    sealing a first bagging material over the first composite section to the layup mandrel to form a first sealed region prior to curing; and
    sealing a second bagging material over the second composite section to the layup mandrel to form a second sealed region prior to curing.

7. The method of claim 6 further comprising:
    removing the first bagging material and the first caul plate from the first composite part prior to removing the first composite part from the layup mandrel.

8. The method of claim 6 further comprising:
    applying a vacuum within each of the first sealed region and the second sealed region prior to curing.

9. The method of claim 1, wherein the post cure operations include at least one of drilling or trimming on the first composite part and the second composite part after removing the first composite part and the second composite part from the layup mandrel.

10. The method of claim 1 further comprising:
    applying an edge material to edges of the first composite section and the second composite section formed by the removing of the at least part of the portion of the plurality of composite plies exposed prior to curing.

11. The method of claim 1, wherein the first composite part is a first half of a fuselage of an aircraft and the second composite part is a second half of the fuselage.

* * * * *